June 11, 1963 L. J. FITZ HARRIS 3,093,264
METALLIC ARTICLE LINED WITH A HALOGENATED OLEFIN POLYMER FILM
Filed April 4, 1955 6 Sheets-Sheet 4

*INVENTOR*
LEO J. FITZ HARRIS
BY
ATTORNEYS

NATURAL RUBBER
POLYTRIFLUOROCHLOROETHYLENE

PHENOLFORMALDEHYDE RESIN

POLYTRIFLUOROCHLOROETHYLENE

*INVENTOR.*
LEO J. FITZ HARRIS

June 11, 1963  L. J. FITZ HARRIS  3,093,264
METALLIC ARTICLE LINED WITH A HALOGENATED OLEFIN POLYMER FILM
Filed April 4, 1955  6 Sheets-Sheet 6

INVENTOR.
LEO J. FITZ HARRIS
BY
ATTORNEYS 3,093,264
Patented June 11, 1963

3,093,264
METALLIC ARTICLE LINED WITH A HALOGENATED OLEFIN POLYMER FILM

Leo J. Fitz Harris, Dayton, Ohio, assignor, by mesne assignments, to Minnesota Mining and Manufacturing Company, St. Paul, Minn., a corporation of Delaware
Filed Apr. 4, 1955, Ser. No. 499,071
5 Claims. (Cl. 220—63)

This invention relates to a novel thermoplastic polymer surface and the method of making it. This invention, in one of its aspects, relates to a process for fusing thermoplastic polymer particles to a thermoplastic polymer film. In another of its aspects this invention relates to the construction of useful end products by means of the novel polymer surface of this invention.

A wide variety of olefinic polymers are commercially available today. These polymers are used as protective coatings, electrical insulation, tank liners, etc. Representative of the better known olefinic polymers are polymers of ethylene, vinyl chloride, vinylidene chloride, and trifluorochloroethylene. These olefinic polymers are fabricated into a variety of useful items by molding and other standard techniques. However, in many instances, for example in the preparation of laminates, the non-adhesive character of the olefinic polymers generally, and of the halogenated olefinic polymers in particular, has seriously limited the utility of the polymer. A number of techniques have been proposed for applying polymer surfaces to other surfaces. Thus, the polymer film has been bonded to fiberglass fabric which in turn is bonded to the other surface by means of a suitable adhesive. This technique involves the use of costly presses, long cycles and interrupted production, and is not always satisfactory. Certain of the olefinic polymers can be flame sprayed, e.g., polyethylene, but this is not advisable with the halogenated olefin polymers and particularly with the perfluorochloroolefin polymers, since they tend to decompose usually with the liberation of toxic fumes. Apart from the decomposition of the material, the bond strength of the polymer coating is not always adequate. Dispersions of polymer particles in suitable liquids have also been tried as a means of applying polymer coatings. However, this technique is obviously limited to use where the surface to be coated is not deleteriously effected by the solvent used in the dispersion and where the coated object can be baked in a limited size oven. Additionally, such dispersions do not always produce the quality of coating which is desired.

It is an object of this invention to provide a thermoplastic halogenated olefin polymer surface which will facilitate the application of polymer surfaces to other materials.

It is another object of this invention to provide a technique for surfacing articles with thermoplastic polymers.

It is another object of this invention to provide a novel method for constructing thermoplastic polymer lined objects.

It is another object of this invention to provide a means for bonding thermoplastic polymers to other materials.

It is another object of this invention to provide a bondable surface on thermoplastic polymers. The term polymer, as used herein, includes both homopolymers and copolymers.

Various other objects and advantages of the present invention will become apparent to those skilled in the art on reading the accompanying description and disclosure.

In general, the above objects are accomplished by interposing a plurality of thermoplastic polymer particles between a surface of a sheet or film of a thermoplastic polymer and a surface of a settable material to which the polymer is to be bonded, fusing the particles to the thermoplastic polymer and embedding them in the settable material. The settable material to which the polymer is to be bonded can additionally be bonded to a surface of another material, e.g., a metal surface. Thus, the particles provide a means for securing or anchoring a polymer film surface to other surfaces or materials. Fusion of the thermoplastic particles to the thermoplastic polymer surface is effected by heating the polymer and particles above the fusion point. The thermoplastic polymer with fused particles may be subjected to a variety of heat treating processes, e.g., quenching, to control physical properties, such as hardness, etc.

In order to illustrate the invention, reference should be had to the following detailed description and figures of the drawing in which:

FIGURES 1, 3, 5 and 7 are photographs of a homopolymer of trifluorochloroethylene film to which was fused particles of a homopolymer of trifluorochloroethylene in varying particle sizes as discussed in the examples. Magnification is about 1.5 times;

FIGURES 2, 4, 6 and 8 are cross-sectional views of FIGURES 1, 3, 5 and 7 respectively, in which the magnification is approximately 15 times;

Figure 12:
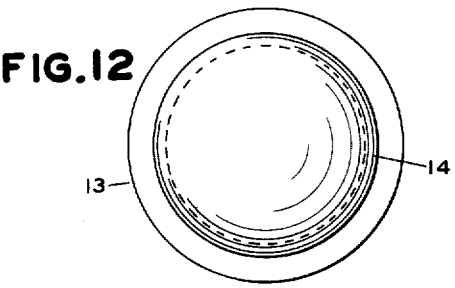
Figure 11:
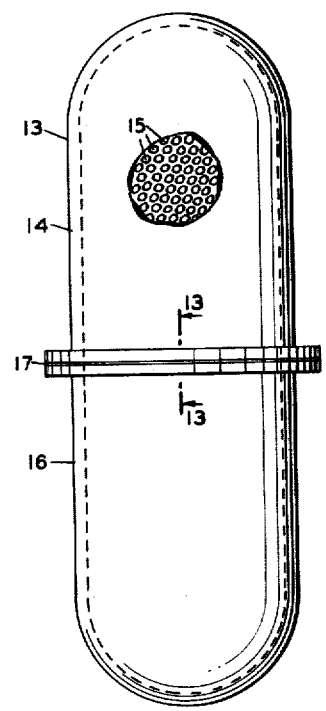
FIGURE 11 is a front view of a tank, constructed by the process of this invention, having a homopolymeric trifluorochloroethylene lining and a supporting phenol formaldehyde exterior.
Figure 13:
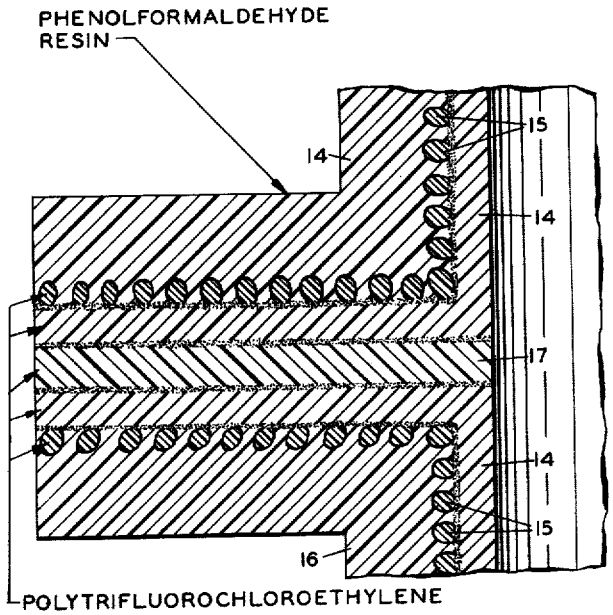
Figure 14:
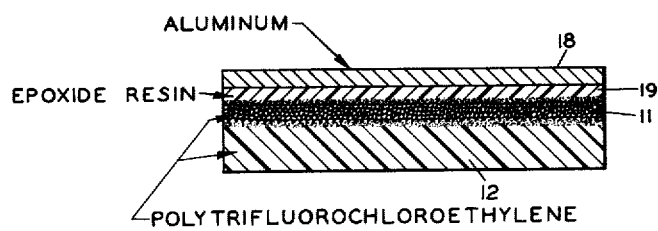
Figure 15:
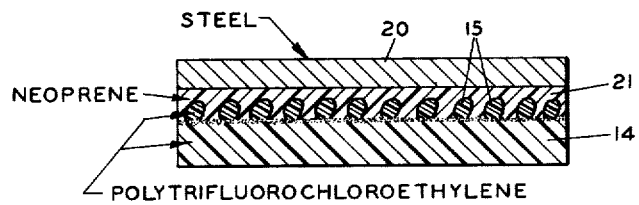

FIGURE 12 of the drawing is a top view of the tank of FIGURE 11;

FIGURE 13 is a cross-sectional view of the tank of FIGURE 11 taken along line 13—13 showing the bonding of the polymeric liner to the supporting phenolic exterior by means of the interposed layer of particles which are fused to the polymeric liner and embedded in the phenolic support;

FIGURE 14 is a cross-sectional view of a homopolymer of trifluorochloroethylene bonded to an aluminum surface with an expoxide resin adhesive;

FIGURE 15 of the drawing is a cross-sectional view of a homopolymer of trifluorochloroethylene bonded to a steel surface with a neoprene cement.

As indicated previously, any thermoplastic polymer, independent of its inherent adhesive characteristics, can be laminated by the process of this invention. Representative of such thermoplastic polymers, are the homopolymers and copolymers of ethylene, vinyl chloride, vinylidene chloride, vinyl acetate and trifluorochloroethylene. While this invention is described with particular reference to the above described representative thermoplastics, it will be apparent that any fusible thermoplastic polymer can be employed. In this connection, it should be noted that the polymer particles and polymer film, while they must be fusible, need not be of the same polymer family. For example, polyvinyl chloride can be fused to polyvinylidene chloride. However, in a preferred method of operation, identical polymer particles and film are employed since maximum bond strength is thus obtained.

Fusion of the polymer particles to the polymer film is accomplished by maintaining them in contact at fusion temperature and in the absence of appreciable pressure for a period of time sufficient to permit fusion. Pressure should be avoided, since otherwise the particles will tend to fuse into the film to produce a heavier film. The fusion operation can be carried out in an oven, in which instance the film, with particles distributed over its surface, is heated at the required temperature for the required period of time. The process can also be carried out in a continuous heating operation in which the thermoplastic polymer film travels on a continuous belt through an oven. The particles are distributed over a surface of the film prior to its passage into the oven. The necessary residence time is obtained by varying the speed at which the film moves and by using an oven of appropriate length. The oven can be heated by electricity, gas or any other convenient heating arrangement. Fusion can also be accomplished by high frequency heating at the frequency appropriate for fusing of the particular resin or polymer and by localized heating, for example with a hot iron.

Quantitative distribution of fused particles over the polymer film will vary depending upon the use for which the polymer film is intended. Where a high bond strength is required, the number of particles per unit area is maintained at a relatively high level, whereas where low bond strength can be tolerated the number of particles per unit area can be maintained at a relatively low level, also areas where no bonding is desired or required can be kept free of anchoring particles of the polymer. Generally, from about 10 to about 100 percent of the area of the thermoplastic film has particles fused to it and preferably 25 to 90 percent of the area.

Control of the distribution of particles can be achieved in a variety of ways. Most molding powders and particularly polymeric trifluorochloroethylene molding powders are available in low density and high density form. The low density powder is a powder of relatively high surface area per unit volume, whereas the high density molding powder has a relatively low surface area per unit volume. When heated to its softening temperature the low density molding powder is converted to a high density powder and contracts to a particle of considerably reduced size (usually about $\frac{1}{10}$ its original size). The high density powder, on the other hand, does not decrease appreciably in size by heating. The distribution of particles over the surface of the film can be controlled by use of either the low or the high density molding powder. For example, if the quantity of particles is to be kept reasonably low, a low density molding powder can be applied evenly over the surface so as to completely cover the surface of the film. On heating the low density powder, it contracts and separately fuses to the film leaving an appreciable area of free space. This same effect can be realized by controlled distribution of the high density molding powder. The variation in the surfaces which can be produced will become more apparent hereinbelow, in the examples and in the figures of the drawings.

Representative of the settable materials to which thermoplastic polymers can be joined by means of the particulate surface of this invention are the hydraulic cements such as plaster, concrete, etc.; natural rubber; elastomers such as Buna-S (GR-S—a styrene-butadiene copolymer), Neoprene (GR-M—polychloroprene), Neoprene FR (polyisoprene), Butyl rubber (GR-I—an isobutylene-isoprene copolymer), Buna-N (a butadiene-acrylonitrile copolymer), Thiokol (an organic polysulfide copolymer), Silicone rubber (dimethyl silane polymer), etc., and low melting metal alloys, such as Woods metal and solder (provided that the metal alloy melts below the fusion temperature of the thermoplastic). From the foregoing, it will be apparent that, by means of the particulate surface of this invention, thermoplastic polymers may be bonded to a considerable variety of settable materials. The settable materials generally are liquid, liquefiable or otherwise distensible at the time they are contacted with the particulate surface so that the material can be forced between, over and around the particles and subsequently set into a relatively firm and substantially non-removable layer after contact has been established. The setting of the material can be accomplished by procedures which are standard with the material involved. For example, concrete, which sets by hydration, can be allowed to stand for the required period of time. Thermosetting resins set by heating at the required temperature, and also by the use of a cross-linking or curing agent which can be accelerated with heat. Where temperature is required, it should not, of course, be above the softening temperature of the polymer involved. In most instances, pressure is not required, although pressure can be employed provided that suitable precautions are taken to protect the polymer film from distortion, as for example by backing up the film.

As indicated previously, a variety of particulate surfaces can be prepared. In selecting the particulate surface, one of the determining factors is the desired bond strength. Another determining factor is the material in which the particulate surface is to be embedded. Thus, where highly viscous mastic type cements, etc. are to be employed, the particles should not be too closely packed, since the cement may not adequately surround them. On the other hand, where the material in its precured state is relatively fluid, then tightly packed particles can be utilized. As indicated previously, the size and distribution of the individual particles can be varied depending upon the particular conditions encountered, that is dependent upon the thickness of the polymer sheet, the viscosity of the convertible resin and the desired bond strength. While particle size can be varied within relatively wide limits, the following tabulation is presented in order to illustrate preferable ranges of particle size depending on film thickness.

TABLE I

| Low Density Particle Size, Inches | Sheet Thickness, Inches |
|---|---|
| 0.017—0.031 | .005—.010 |
| 0.031—0.063 | .010—.015 |
| 0.063—0.094 | .015—.025 |
| .094 and up | .025—.025 |

| High Density Particle Size, Inches | Sheet Thickness, Inches |
|---|---|
| .005—.010 | .005—.010 |
| .010—.020 | .010—.015 |
| .020—.040 | .015—.025 |
| .040 and up | .025 and up |

In order to illustrate the preparation of the particulate surfaces of this invention, the following examples are presented below.

*Example I*

Figure 1:
Figure 2:
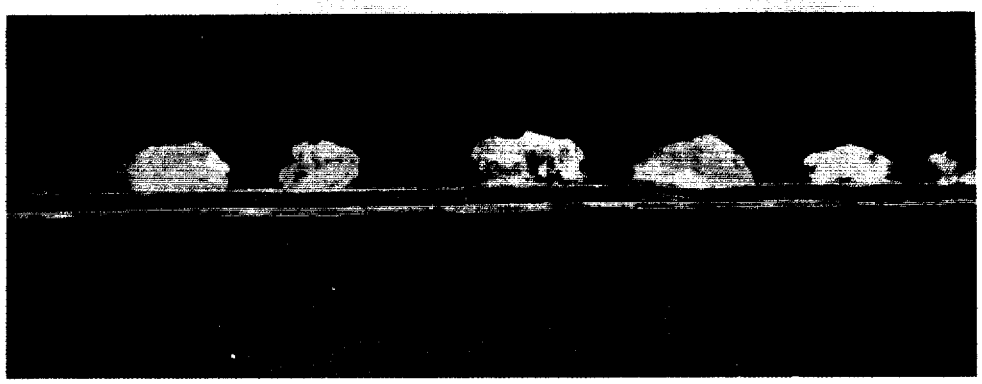

The homopolymer of trifluorochloroethylene, N.S.T. (no strength temperature) about 300 was covered with finely divided low density polymeric trifluorochloroethylene molding powder. The entire surface of the polymer film was covered. The film and particles were placed in an oven where they were heated at a temperature of about 250° C. for about 30 minutes. The film was removed from the oven and quenched in cool water. The non-fused or loosely bonded particles were removed from the film by scraping and are reusable. FIGURES 1 and 2 of the drawing show the particulate surface film thus produced. In FIGURE 1, the photograph was taken at a 90° angle with a magnification of approximately 1.5 times. FIGURE 2 of the drawing was taken, using standard metallurgical techniques (i.e., a section of the film was cast in a Bakelite cylinder and polished). Magnification here was about 15 times.

*Example II*

Figure 3:
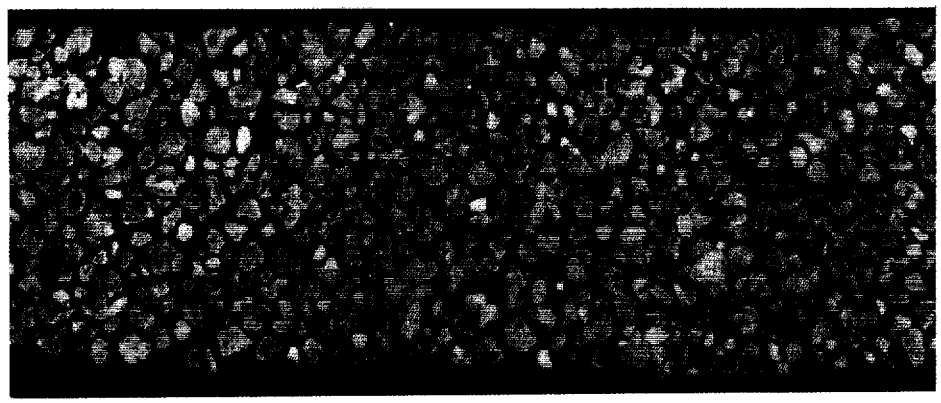
Figure 4:
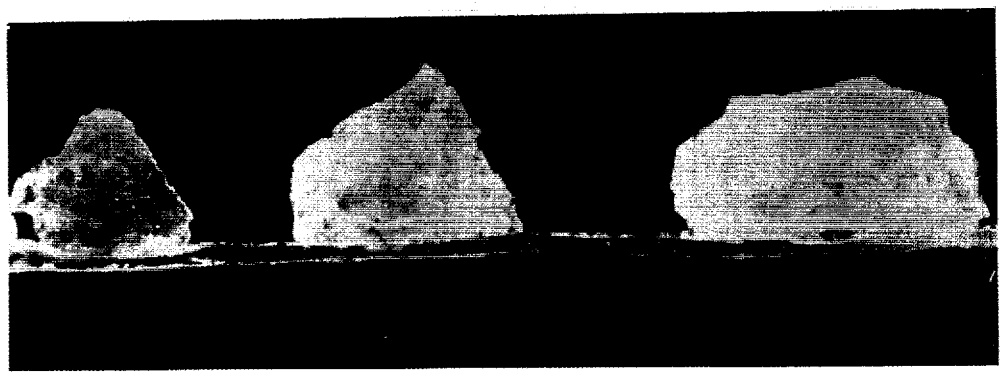

The process of Example I was repeated, except that larger particle size powder was used. FIGURE 3 presents a 90° angle view of the particulate surface on the film in which the magnification is approximately 1.5 times. FIGURE 4 is a cross-section of FIGURE 3 obtained by metallurgical techniques in which the magnification is approximately 15 times.

Examples III

Figure 5:
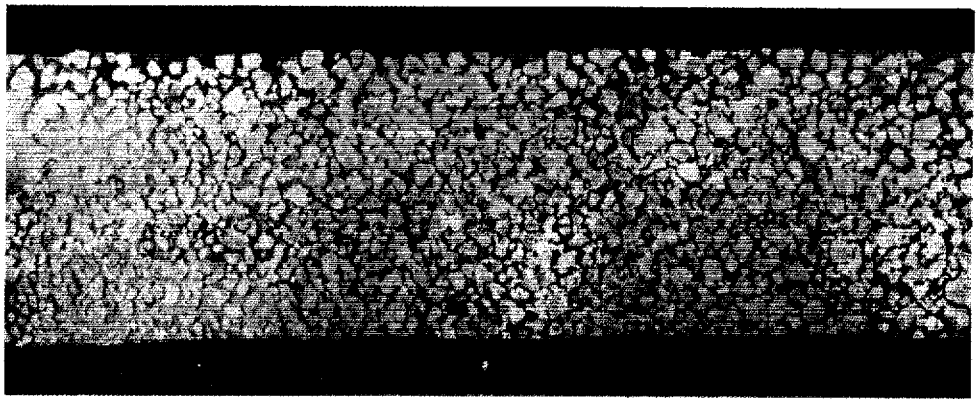
Figure 6:
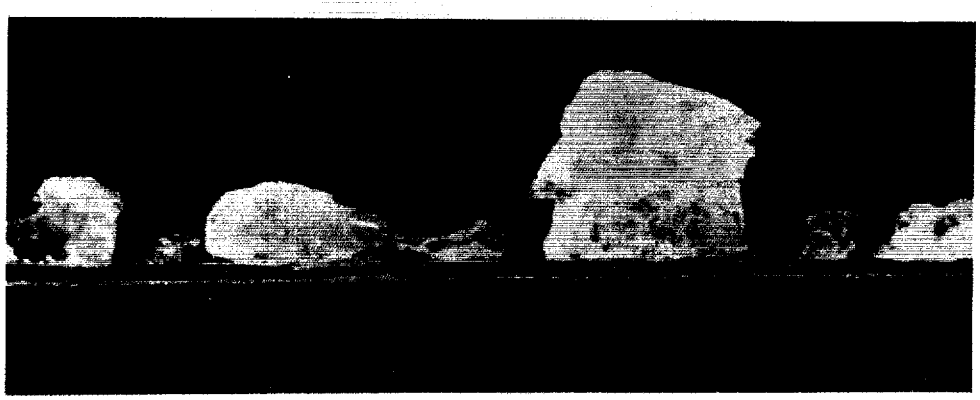

Approximately equal parts of the small and the large particle size powders used in Example I and II respectively, were admixed. The admixed particles were evenly distributed over a film of a homopolymer of trifluorochloroethylene, such as used in Example I and II. The film and particles were then heated in an oven at 250° C. for approximately 30 minutes after which non-fused particles were removed by scraping. FIGURE 5 is a photograph taken at approximately 90° angle of the particulate surface thus produced. Magnification is approximately 1.5 times. FIGURE 6 is a cross-section of FIGURE 5 obtained by metallurgical techniques in which the magnification is approximately 15 times.

Example IV

Figure 7:
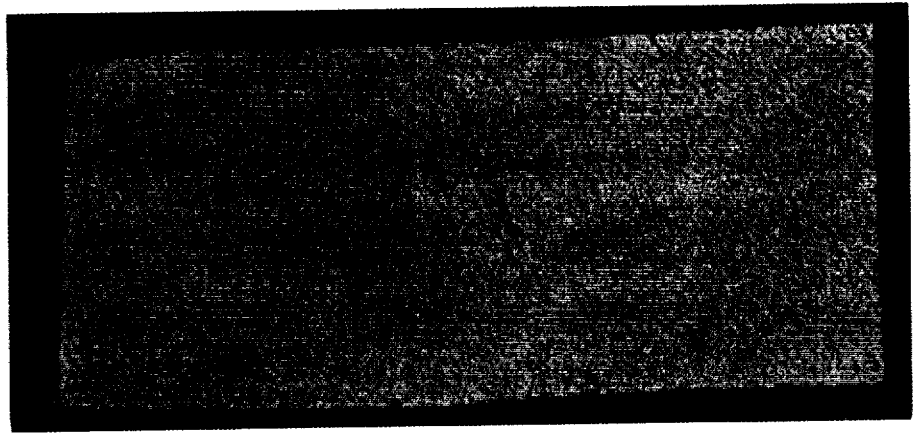
Figure 8:
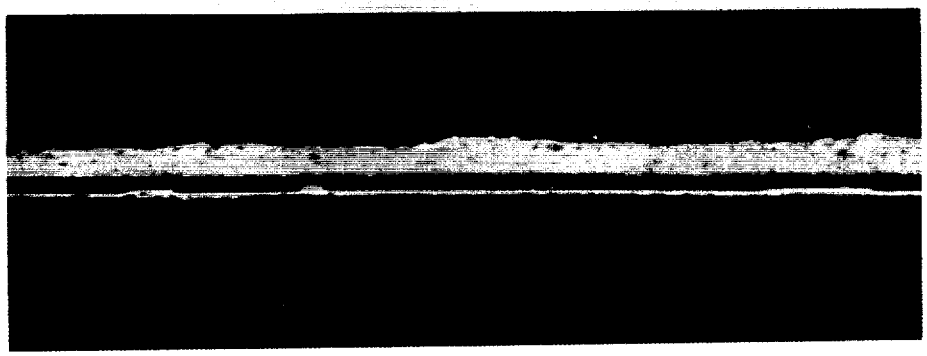

As indicated previously, a variety of surfaces can be prepared. In the preceding examples a low density molding powder was used which contracted on heating, leaving free spaces around the individual particles. This example, FIGURE 7, illustrates the preparation of a fine-grained porous particulate surface. In this example finely divided (about 200 mesh) high density polymeric trifluorochloroethylene molding powder was evenly distributed over a surface of a film of a homopolymer of trifluorochloroethylene. The film and particles were heated at a temperature of about 250° for approximately 30 minutes after which unfused particles were removed by scraping and the resulting product quenched in cool water. FIGURE 7 is a photograph taken at a 90° angle to the particulate surface. Magnification is about 1.5 times. FIGURE 8 is a cross-sectional view of FIGURE 7 obtained by metallurgical techniques. Magnification is approximately 15 times. In this example, the individual particles of the polymer are fused to the polymer film and to surrounding polymer particles. A porous fine-grained surface was produced by this technique.

The above examples illustrate the preparation of a particulate surface on a surface of a homopolymer of trifluorochloroethylene. By employing substantially identical techniques with appropriate modification of fusion temperature, substantially similar surfaces can be developed on other thermoplastic polymer films. The following examples illustrate this point.

Example V

A film of a homopolymer of ethylene is covered with homopolymeric ethylene molding powder. The polymer film and particles are then heated in an oven maintained at a temperature of about 115° C. for about 10 minutes after which the film together with fused particles is removed, and scraped, to remove loose particles. The surfaces obtained with the polyethylene material are similar to the surfaces shown photographically in FIGURES 1, 3, 5 and 7. Since polyethylene is not available in low density form, distribution of the particles is controlled mechanically.

Example VI

A film of a polymer of vinylidene chloride is covered with particles of a polymer of vinylidene chloride. The film and particles are then heated at a temperature of about 185° C. for about 15 minutes after which the film with fused particles is removed, scraped and quenched. Surfaces corresponding to the surfaces portrayed in FIGURES 1, 3, 5 and 7 are obtained by selection of the particle size and by distribution of the particles over the film surface.

Example VII

A film of a polymer of vinyl chloride is covered with particles of a polymer of vinyl chloride. The film and particles are then heated at their fusion temperature about 175° C. for about 15 minutes, after which the film with fused particles is removed, scraped and quenched. Surfaces corresponding to the surfaces portrayed in FIGURES 1, 3, 5 and 7 are obtained by selection of the particle size and by distribution of the particles over the film surface.

Example VIII

A film of a copolymer of vinyl chloride and vinyl acetate is covered with particles of a polymer of vinyl chloride and vinyl acetate. The film and particles are then heated at a temperature of about 150° C. for about 15 minutes after which the film with fused particles is removed, scraped and quenched. Surfaces corresponding to the surfaces portrayed in FIGURES 1, 3, 5 and 7 are obtained by selection of the particle size and by distribution of the particles over the film surface.

After the particulate surface has been prepared, as described above, it can then be bonded to a considerable number of materials. As indicated previously, the materials to which the particulate surface can be bonded are characterized, in that they are all "settable" or "convertible." These settable or convertible materials are distensible, i.e., liquid, liquefiable or otherwise capable of being forced between, around and over the particles under the conditions of application, and subsequently set or converted to a relatively non-distensible, non-liquid and non-flowable material. The use of the particulate surfaces of this invention in the fabrication of a number of end items is described in the examples below.

Example IX

Figure 9:
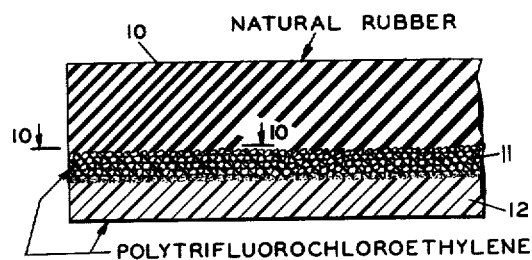
FIGURE 9 is a cross-sectional view of a film of a homopolymer of trifluorochloroethylene which is bonded to a layer of natural rubber by interposed polymer particles which are fused to the polymer film and embedded in the natural rubber.
Figure 10:
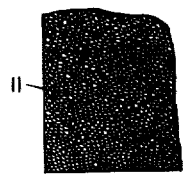
FIGURE 10 is a view along line 10—10 of FIGURE 9 showing the distribution of particles.

Finely divided (about 200 mesh) high density homopolymeric trifluorochloroethylene molding powder, was evenly distributed over a surface of a film of a homopolymer of trifluorochloroethylene. The film and particles were heated at a temperature of about 250° C. for approximately 30 minutes after which unfused particles were removed by scraping. The resulting product was quenched in cool water. The particulate surface of this example is illustrated photographically in FIGURES 7 and 8 and diagrammatically in FIGURE 10 of the drawing. The particulate surface thus produced, was embedded in a sheet of uncured 50 durometer natural rubber approximately 0.5 inch thick. The rubber was cured for 20 minutes at approximately 160° C. The rubber was firmly bonded to the polytrifluorochloroethylene film which formed a protective surface for the rubber. The resulting product is illustrated diagrammatically in FIGURE 9 of the drawing in which reference numeral 10 indicates the natural rubber component, reference numeral 11 indicates the particles which are fused to the polymer surface and reference numeral 2 indicates the polymer surface of polytrifluorochloroethylene. FIGURE 10 is a view of the particulate surface and FIGURE 9 is taken along line 10—10. Bonding of the rubber layer to other surfaces, such as steel, can be accomplished using rubber cement. In this connection, it should be noted that the intermediate rubber layer affords protection to the polymer film since the rubber layer is resilient and will absorb shock, as contrasted with the relatively hard and brittle intermediate layer obtained by the use of most thermo-setting resins, as for example, the epoxide resins. The use of rubber as a bonding layer will in many instances be advantageous because of this property.

Example X

A homopolymer of trifluorochloroethylene, N.S.T. about 300 was covered with finely divided low density polymeric trifluorochloroethylene molding powder. The film and particles were placed in an oven and heated for about 30 minutes at a temperature of about 500° F. The film was removed from the oven and quenched in cool water. The particulate surface thus prepared is illustrated photographically in FIGURES 1 and 2 of the drawing. The particulate surface of the polymer film was coated with an epoxide resin (Epon 828) which is a condensation product of bisphenol and epichlorohydrin to which has been added approximately 14 weight parts/ 100 resin parts of metaphenylene diamine (Shell catalyst C1). The film and applied epoxide resin were then placed in contact with an aluminum panel after which the assembly was cured by heating for approximately 30 minutes at 115° C. A protective sheet or coating of polytrifluorochloroethylene was thus firmly bonded to the aluminum panel. This structure is shown diagrammatically in FIGURE 14 of the drawing in which reference numeral 18 is the aluminum panel, reference numeral 19 is the epoxide resin, reference numeral 11 represents the polymer particles and reference numeral 12 is the polytrifluorochloroethylene film.

*Example XI*

The procedure and materials described above were used to bond a polytrifluorochloroethylene film to a steel surface. The protective coating of polytrifluorochloroethylene was firmly bonded to the steel panel. This structure corresponds to FIGURE 14 of the drawing except that the aluminum was replaced with steel.

*Example XII*

A particulate surface was prepared on a homopolymer of trifluorochloroethylene as described in Example II and as shown photographically in FIGURES 3 and 4 of the drawing. The particulate surface was coated with a GR-S based cement (a copolymer of butadiene and styrene marketed by Minnesota Mining and Manufacturing as EC-524). Most of the solvent was allowed to evaporate at room temperature and while still tacky the rubber cement was placed in contact with a steel panel. The cement was given a gentle cure at 65° C. for 30 minutes. The polytrifluorochloroethylene polymer surface was firmly bonded to the steel panel. This structure is shown diagrammatically in FIGURE 15 of the drawing in which reference numeral 20 indicates the steel surface, reference numeral 21 indicates the neoprene cement, reference numeral 15 indicates the particulate surface of the polymer and reference numeral 14 indicates the polymer film.

*Example XIII*

A particulate surface was prepared on a homopolymer of trifluorochloroethylene corresponding to that described in Example III. The particulate surface was then embedded in Portland cement. The cement was allowed to set, after which the polymer film could not be removed without destruction of the film. The use of the particulate surface of this invention in bonding polymer sheets and films to hydraulic cements is considered to be valuable in industrial plants where a spillage of corrosive chemicals is anticipated. Chemically resistant thermoplastic polymers, such as the homopolymer of trifluorochloroethylene, can be fabricated into standard sized floor tiles, applied, and be set into the concrete flooring. The particulate surface can also be applied as a protective polymer layer on plaster walls, etc.

*Example XIV*

A particulate surface was prepared on a homopolymer of trifluorochloroethylene corresponding to that described in Example III and shown photographically in FIGURES 5 and 6. The particulate surface was coated with neoprene based cement (Minnesota Mining and Manufacturing EC-880). Most of the solvent was permitted to evaporate at room temperature. While still tacky, the neoprene cement was placed in contact with a steel panel. The assembly was seated at 150° F. for approximately ½ hour. The polytrifluorochloroethylene polymer film was firmly bonded to the steel panel, this product is illustrated diagrammatically in FIGURE 15 of the drawing in which reference numeral 21 represents the intermediate layer of neoprene.

*Example XV*

Laminated structures similar to that described in Example IX, are prepared using silicon rubber, Hevea rubber and butyl rubber with appropriate adjustment of curing time and temperature for the particular rubber employed.

*Example XVI*

Employing the procedure of the preceding Examples 9–15, the particulate surface of the polyethylene of Example V, polyvinylidene chloride of Example VII and the polyvinyl chloride-vinyl acetate copolymer of Example VII is used to obtain laminates corresponding to the polytrifluorochloroethylene laminates previously described.

As indicated previously, a considerable variety of end products can be prepared using the particulate surface of this invention. The foregoing examples illustrate the preparation of laminates in the form of coatings. The following examples are intended to show the use of the particulate surface of this invention in the preparation of vessels, pipes, etc. This example illustrates the construction of a tank.

*Example XVII*

A film of a homopolymer of trifluorochloroethylene (approximately 5 mills thick) is formed into a cylindrical shape, closed at one end. Particles of a homopolymer of trifluorochloroethylene are fused to the outer surface of the film by heating, as described in Example I. Uncured phenol formaldehyde resin in liquid form is applied evenly over the particulate surface of the polymer by spraying until a thickness of about 25 mills is reached. The phenol formaldehyde resin is then cured by heating at about 275° F. The cured phenol resin is firmly bonded to the polymeric lining. A second cylinder is prepared as described above. A gasket of polytrifluorochloroethylene, preferably the elastomeric copolymer of trifluorochloroethylene and vinylidene fluoride in a 50/50 mol ratio, is then prepared with a circumference corresponding to the circumference of the open ends of the two cylinders. The gasket is used to provide a cushion between the flanges and to take up irregularities, the gasket can be omitted when the tank is not subject to shock, etc. The open ends of the two cylinders are then brought into contact with the intervening gasket. Holes are drilled through the flange and bolts are inserted so as to clamp the two cylinders together. A rigid tank (capacity about 30 gallons) suitable for storage of corrosive chemicals is thus produced. This tank is illustrated in FIGURES 11, 12 and 13 of the drawings in which FIGURE 11 is a front view, and FIGURE 12 is a top view, FIGURE 13 is a cross-sectional view taken along line 13—13. Referring to the figures of the drawings, reference numeral 14 represents the inner layer of the homopolymer of trifluorochloroethylene, reference numeral 15 represents the particles of polymeric trifluorochloroethylene which are fused to the polymer film and which are embedded in the phenol formaldehyde resin which is represented by reference numeral 16. Reference numeral 17 represents the polytrifluorochloroethylene gasket.

Other useful containers, conduits, pipes, etc., can be prepared using the tank described in the preceding example by selecting a suitable dimensional form of the thermoplastic polymer. The following example illustrates the fabrication of a plastic lined pipe.

*Example XVIII*

An extruded tube of a homopolymer of trifluorochloroethylene is heated in contact with particles of polymeric trifluorochloroethylene substantially as described in Example I. During the heating operation, the tube which is of approximately 1 inch inside diameter is supported on a steel mandrel. After the particles have been fused to the outer surface of the tube, the tube is covered with an epoxide resin (a condensation product of bisphenol and epichlorohydrin available commercially as Epon 828). The resin contains approximately 14 weight percent of metaphenylene diamine curing agent. The resin is cured by heating at approximately 60° C. for approximately 60 minutes. A chemically resistant plastic lined pipe having excellent impact resistance is thus produced.

Where flexibility is an important feature of the vessels which can be fabricated by the process of this invention, then elastomeric materials, such as natural rubber, neoprene, etc. can be substituted for the relatively hard thermo-setting resins used in Examples XVII and XVIII. The following example illustrates the preparation of a flexible lined pipe.

*Example XIX*

An extruded tube (5 mills wall thickness) of a homopolymer of trifluorochloroethylene is prepared with a particulate surface corresponding that described in Example XVIII. The tube with particles fused to its outer surface, is supported on a steel mandrel and is wrapped with uncured 50 durometer natural rubber, approximately 0.06" thick. In wrapping with the rubber, sufficient pressure is used to embed the particles in the inner layer of the rubber sheet by stretching the rubber sheet as it is applied. The tube is wrapped until an outer rubber layer approximately 0.12" thick is obtained. The rubber is then cured by heating at approximately 160° C. for about 0.5 hour. The rubber is firmly bonded to the inner polytrifluorochloroethylene protective liner and acts as a resilient and flexible support for the liner. While natural rubber is used in this example, other elastomeric materials can be substituted to meet the requirements of the particular application. For example, where oil-resistance is required of the flexible rubber supporting exterior layer, neoprene can be employed. In constructing these resilient pipes, the outer rubber layer can also be applied from cements, and by other convenient techniques.

Various alterations and modifications of the invention and its aspects may become apparent to those skilled in the art without departing from the scope of this invention.

Having thus described my invention, I claim:

1. A novel vessel which comprises an inner protective layer of a difficultly bondable thermoplastic halogenated olefin polymer film, an outer supporting layer of a settable material and interposed between said inner protective layer and said outer supporting layer a plurality of thermoplastic olefin polymer particles, said particles being fused to a surface of said protective layer and being embedded in a surface of said supporting layer prior to setting said settable material.

2. A novel tank which comprises an inner protective layer of a difficultly bondable thermoplastic trifluorochloroethylene polymer film, an outer supporting layer of a rigid phenol formaldehyde resin and interposed between said protective polymer film and said supporting resin a plurality of trifluorochloroethylene polymer particles, said particles being fused to a surface of said protective polymer film and being embedded in a surface of said supporting resin prior to rigidifying said resin.

3. A new article of manufacture comprising a metal surface, a layer of a settable material bonded to said metal surface, a layer of a difficultly bondable thermoplastic halogenated olefin polymer film and interposed between said settable material and said thermoplastic polymer film a plurality of particles of a thermoplastic polymer, said particles being fused to one surface of said thermoplastic polymer and being embedded in the surface of said settable material facing said one surface prior to setting said settable material.

4. The article of manufacture of claim 3 in which the metal is aluminum.

5. The article of manufacture of claim 3 in which the metal is iron.

References Cited in the file of this patent

UNITED STATES PATENTS

| | | |
|---|---|---|
| 2,340,452 | Child et al. | Feb. 1, 1944 |
| 2,387,181 | Proctor | Oct. 16, 1945 |
| 2,478,181 | Coker et al. | Aug. 9, 1949 |
| 2,499,134 | De Bruyne | Feb. 28, 1950 |
| 2,554,262 | Nagel | May 22, 1951 |
| 2,568,111 | Bond | Sept. 18, 1951 |
| 2,622,056 | De Coudres | Dec. 16, 1952 |
| 2,690,411 | Seymour | Sept. 28, 1954 |
| 2,697,058 | Lasak | Dec. 14, 1954 |
| 2,706,497 | Shobert | Apr. 19, 1955 |
| 2,711,985 | Olson | June 28, 1955 |
| 2,724,672 | Rubin | Nov. 22, 1955 |
| 2,774,704 | Smith | Dec. 18, 1956 |

UNITED STATES PATENT OFFICE
CERTIFICATE OF CORRECTION

Patent No. 3,093,264                                                  June 11, 1963

Leo J. Fitz Harris

It is hereby certified that error appears in the above numbered patent requiring correction and that the said Letters Patent should read as corrected below.

Column 8, lines 16 and 17, for "Example VII" read -- Example VIII --.

Signed and sealed this 21st day of April 1964.

(SEAL)
Attest:

ERNEST W. SWICER                             EDWARD J. BRENNER
Attesting Officer                                Commissioner of Patents